(12) United States Patent
Palmer

(10) Patent No.: US 9,950,835 B2
(45) Date of Patent: Apr. 24, 2018

(54) PRODUCT DISTRIBUTION METHODS AND APPARATUS

(75) Inventor: Roger Keith Palmer, Katlkatl (NZ)

(73) Assignee: FOODCAP INTERNATIONAL LIMITED, Auckland Central (NZ)

( * ) Notice: Subject to any disclaimer, the term of this patent is extended or adjusted under 35 U.S.C. 154(b) by 886 days.

(21) Appl. No.: 11/632,912

(22) PCT Filed: Jul. 20, 2005

(86) PCT No.: PCT/NZ2005/000185
§ 371 (c)(1),
(2), (4) Date: Dec. 26, 2007

(87) PCT Pub. No.: WO2006/009482
PCT Pub. Date: Jan. 26, 2006

(65) Prior Publication Data
US 2009/0063166 A1  Mar. 5, 2009

(30) Foreign Application Priority Data

Jul. 20, 2004 (NZ) ........................................ 534244

(51) Int. Cl.
*A47F 5/04* (2006.01)
*A47F 5/05* (2006.01)
(Continued)

(52) U.S. Cl.
CPC ............. *B65D 19/42* (2013.01); *A47F 5/06* (2013.01); *A47F 13/00* (2013.01); *G06Q 10/02* (2013.01)

(58) Field of Classification Search
CPC ... A47F 5/05; A47F 5/06; A47F 13/00; B65D 19/42

(Continued)

(56) References Cited

U.S. PATENT DOCUMENTS 1,577,851 A    3/1926 Peschke
2,105,941 A    8/1933 Gleason
(Continued)

FOREIGN PATENT DOCUMENTS

AU    75151/81 B    11/1985
CA    2896323 A1 *  7/2014    ............... A47F 3/06
(Continued)

OTHER PUBLICATIONS

Salmon "Survey of Supply Chain Effectiveness," 2002, Grocery Manufacturers Association / Food Products Association, pp. 1-50 at http://www.gmabrands.com/publications/docs/SupplyChain.pdf; Accompanied with listed publications by year on pp. 51-53 at http://www.gmabrands.com/publications.*

(Continued)

*Primary Examiner* — Stanton L Krycinski
(74) *Attorney, Agent, or Firm* — Birch, Stewart, Kolasch & Birch, LLP

(57) ABSTRACT

Products (30) are distributed to retail outlets in containers (20). The products (30) are loaded onto the tray assembly (1) that is placed in a container (20) at a production or storage facility and transported to the retail outlet. Information as to a sequence in which the products (30) will be placed on retail shelving (32) at the retail outlet is used to determine a loading order of the products (30) on the tray assembly (1) so that the products (30) may be removed from the carrying device in the order required for placement on the retail shelves (32). The tray assembly (1) is removable from the container, and the trays (6) are moveable relative to each other to facilitate loading and unloading.

12 Claims, 7 Drawing Sheets

Figure 1:
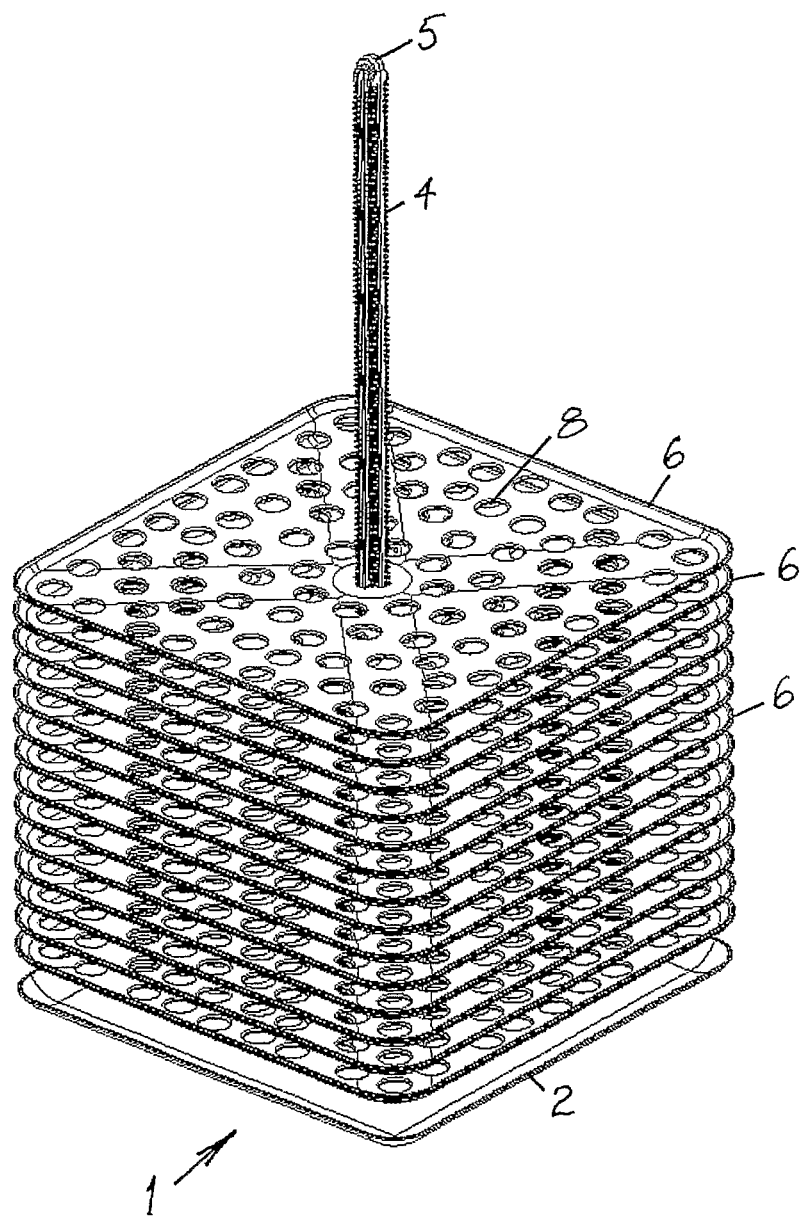

(51) Int. Cl.
  *A47F 5/06* (2006.01)
  *B65D 19/42* (2006.01)
  *A47F 13/00* (2006.01)
  *G06Q 10/02* (2012.01)

(58) Field of Classification Search
  USPC ............................................. 705/1, 1.1, 500
  See application file for complete search history.

(56) References Cited

U.S. PATENT DOCUMENTS

| | | | |
|---|---|---|---|
| 2,015,941 A | | 1/1938 | Gleason |
| 2,176,384 A | * | 10/1939 | Varney .......................... 211/59.2 |
| 2,178,384 A | | 10/1939 | Varney |
| 2,346,232 A | | 4/1944 | Piret et al. |
| 2,401,417 A | * | 6/1946 | Engle ............................... 312/35 |
| 2,498,125 A | * | 2/1950 | Knudsen .................... 366/325.4 |
| 2,507,951 A | | 5/1950 | Barnes |
| 2,997,858 A | | 8/1961 | Perez |
| 3,059,452 A | | 10/1962 | Griffin |
| 3,122,748 A | | 2/1964 | Beebe, Jr. |
| 3,158,264 A | * | 11/1964 | Bittner ....................... A47F 5/06 108/105 |
| 3,272,890 A | * | 9/1966 | O'Leary, Jr. .................. 525/130 |
| 3,642,263 A | | 2/1972 | Pine et al. |
| 3,698,779 A | * | 10/1972 | Holmes ...................... A47F 5/06 108/94 |
| 3,894,679 A | | 7/1975 | Reifers et al. |
| 3,922,358 A | | 11/1975 | Follett et al. |
| 3,951,079 A | | 4/1976 | Tolleson |
| 3,986,655 A | | 10/1976 | Rynning et al. |
| 4,336,759 A | * | 6/1982 | Hannecke ................. A47F 5/06 108/144.11 |
| 4,488,412 A | | 12/1984 | Weaver et al. |
| 4,498,401 A | | 2/1985 | Hannecke et al. |
| 4,522,835 A | | 6/1985 | Woodruff et al. |
| 4,534,692 A | | 8/1985 | Shiomi |
| 4,538,862 A | * | 9/1985 | Chandler .................. A47F 3/00 312/184 |
| 4,603,771 A | | 8/1986 | Felder |
| 4,643,104 A | * | 2/1987 | Rasmussen .................... 108/105 |
| 4,659,578 A | | 4/1987 | Schlegel |
| 4,688,684 A | | 8/1987 | Young et al. |
| 4,736,856 A | | 4/1988 | Alneng et al. |
| 4,744,204 A | | 5/1988 | Schlegel et al. |
| 4,772,480 A | | 9/1988 | Yamane et al. |
| 4,919,955 A | | 4/1990 | Mitchell |
| 4,971,507 A | * | 11/1990 | Weggelaar .................... 414/279 |
| 4,994,294 A | | 2/1991 | Gould |
| 5,129,238 A | | 7/1992 | Schwartz et al. |
| 5,201,437 A | | 4/1993 | Burgdorf et al. |
| 5,222,619 A | | 6/1993 | Gregory |
| 5,305,615 A | | 4/1994 | McFadden et al. |
| 5,353,495 A | | 10/1994 | Terabayashi et al. |
| 5,397,000 A | | 3/1995 | Holte et al. |
| 5,481,852 A | | 1/1996 | Mitchell |
| 5,609,039 A | | 3/1997 | Green et al. |
| 5,670,195 A | | 9/1997 | Palmer |
| 5,704,485 A | | 1/1998 | Cautereels et al. |
| 5,799,787 A | * | 9/1998 | Talbot .................... B25H 3/025 206/315.11 |
| 6,042,859 A | | 3/2000 | Shalai et al. |
| 6,054,161 A | | 4/2000 | Palmer |
| 6,113,962 A | | 9/2000 | Spencer |
| 6,138,842 A | * | 10/2000 | Rios .......................... A47F 5/10 211/133.4 |
| 6,139,240 A | | 10/2000 | Ando et al. |
| 6,182,053 B1 | | 1/2001 | Rauber et al. |
| 6,194,012 B1 | | 2/2001 | Palmer et al. |
| 6,210,730 B1 | | 4/2001 | Mitchell |
| D444,690 S | | 7/2001 | Bond |
| 6,318,114 B1 | | 11/2001 | Slaughter |
| 6,430,467 B1 | | 8/2002 | D'Amelio et al. |
| 6,520,352 B2 | | 2/2003 | Mondragon et al. |
| D480,581 S | | 10/2003 | Searer |
| 6,671,578 B1 | | 12/2003 | D'Amelio et al. |
| D490,848 S | | 6/2004 | Pope et al. |
| 6,766,914 B1 | * | 7/2004 | Rios .......................... A47F 5/06 211/133.4 |
| D524,007 S | * | 6/2006 | Palmer .......................... D34/19 |
| D525,759 S | * | 7/2006 | Palmer .......................... D34/27 |
| 2002/0106432 A1 | | 8/2002 | Yamagata et al. |
| 2002/0139126 A1 | | 10/2002 | Butler |
| 2003/0003205 A1 | | 1/2003 | Costello |
| 2003/0015446 A1 | | 1/2003 | Talbot |
| 2003/0152679 A1 | | 8/2003 | Garwood |
| 2003/0170357 A1 | | 9/2003 | Garwood |
| 2004/0081731 A1 | | 4/2004 | Hood |
| 2004/0101386 A1 | | 5/2004 | Robey |
| 2008/0166460 A1 | * | 7/2008 | Palmer .................... A23B 4/06 426/389 |
| 2008/0292759 A1 | * | 11/2008 | Palmer .................. A22C 7/0046 426/389 |

FOREIGN PATENT DOCUMENTS

| | | |
|---|---|---|
| DE | 11479 | 11/1880 |
| DE | 35 15 728 A1 | 10/1986 |
| DE | 3834483 A1 | 4/1990 |
| DE | 197 14 079 A1 | 10/1998 |
| DE | 197 56 551 A1 | 7/1999 |
| DE | 298 14 220 U1 | 7/1999 |
| EP | 0001507 A1 | 4/1979 |
| EP | 0 092 816 A2 | 11/1983 |
| EP | 0 250 911 A1 | 1/1988 |
| EP | 0 330 473 A1 | 8/1989 |
| EP | 0 384 885 A2 | 8/1990 |
| EP | 0 391 467 A1 | 10/1990 |
| EP | 0 834 455 A1 | 4/1998 |
| FR | 2 118 881 | 8/1972 |
| FR | 2 708 910 A1 | 2/1995 |
| FR | 2 736 894 A1 | 1/1997 |
| GB | 371907 A | 4/1932 |
| GB | 679986 A * | 9/1952 ............... A47F 5/06 |
| GB | 1 203 403 A | 8/1970 |
| GB | 1444911 | 9/1973 |
| GB | 2154553 A | 9/1985 |
| GB | 2 207 665 A | 2/1989 |
| IT | 1245758 B | 10/1994 |
| JP | 1933-3519 B | 8/1933 |
| JP | 51-25206 U1 | 2/1976 |
| JP | 61-295929 A | 12/1986 |
| JP | 6-173024 A | 7/1987 |
| JP | 62-166872 A | 7/1987 |
| JP | 8-107616 A | 4/1996 |
| JP | 8-143067 A | 6/1996 |
| JP | 9-193936 A | 7/1997 |
| JP | 10-28563 | 2/1998 |
| JP | 10-45257 A | 2/1998 |
| JP | 2000-7113 A | 1/2000 |
| JP | 2001-248949 A | 9/2001 |
| JP | 2002/005689 A | 1/2002 |
| JP | 2002-347944 A | 12/2002 |
| NL | 1013969 C | 10/2000 |
| RU | 2221972 C2 | 1/2004 |
| WO | WO-1989/006208 A1 | 7/1989 |
| WO | WO-1991/016237 A1 | 10/1991 |
| WO | WO-1994/011269 A1 | 5/1994 |
| WO | WO-96/36233 A | 11/1996 |
| WO | WO 99/12428 A1 | 3/1999 |
| WO | WO-1999/015415 A1 | 4/1999 |
| WO | WO-2000/075584 A1 | 12/2000 |
| WO | WO-2001/021514 A1 | 3/2001 |
| WO | WO-2001/091565 A1 | 12/2001 |
| WO | WO-2002/059007 A1 | 8/2002 |
| WO | WO-2006/041323 A | 4/2006 |

OTHER PUBLICATIONS

Mate Definition, Webster's New Basic Dictionary, 2007, Houghton Mifflin Company, p. 439.*
Engage Definition, Webster's New Basic Dictionary, 2007, Houghton Mifflin Company, p. 238.*

(56) References Cited

OTHER PUBLICATIONS

Salmon "Survey of Supply Chain Effectiveness, "2002, Grocery Manufactures Association/Food Products Association, pp. 1-50 at <http://www.gmacbrands.com/publications/docs/SupplyChain.pdf>; Accompanied with listed publications by year on pp. 51-53 at http://www.gmabrands.com/publications.

English translation of the Japanese Notification of Reasons for Refusal, dated Oct. 23, 2012, for Japanese Application No. 2007-522464.

English translation of the Japanese Notification of Reasons for Refusal, dated Oct. 4, 2011, for Japanese Application No. 2007-522464.

Extended European Search Report, dated Nov. 25, 2011, for European Application No. 05764498.1.

New Zealand Examination Report, dated Feb. 21, 2007, for New Zealand Application No. 534244.

\* cited by examiner

PRODUCT DISTRIBUTION METHODS AND APPARATUS

FIELD OF THE INVENTION

This invention relates to methods and apparatus for product distribution and storage. The invention has application to retail distribution, and has particular application to foodstuffs, including perishable foodstuffs, such as meat. However, the invention is not limited to these applications.

BACKGROUND

Existing methods for delivery of products from a central warehouse or processing facility to retail shelves include a number of inefficiencies.

Stacking products on shelves, particularly in a retail environment, is a labour intensive exercise. Typically, articles to be stacked on retail shelves are provided from a storage facility in boxes on pallets. The articles are usually unpacked from individual boxes and manually lifted onto a trolley or shopping cart and sorted (again manually) into the appropriate shelving space. Therefore, products that are required at any particular point on the shelf must be located from a jumble of articles in the cart or trolley.

With perishable products, such as meat, the time taken to perform the retail distribution process is important to product quality. The longer the meat is exposed to ambient temperatures, the lower its quality and the shorter its shelf life.

There is often a substantial amount of manual lifting required to lift objects from boxes onto a cart or trolley, and then from the cart or trolley onto retail shelves Which may be up to a meter higher than the position of the product in the cart. This manual lifting of articles to be stacked may occur many times throughout a shelf stacking process, for example products needing to be lifted from a delivery vehicle such as a truck for example, onto a pallet and then being lifted again from the pallet into the shelves.

OBJECTS

It is an object of the present invention to provide product distribution apparatus or methods which increase the efficiency of product distribution, or retail shelf stacking.

Alternatively, it is an object of the present invention to provide product distribution apparatus or methods which will at least overcome one or more disadvantages of existing apparatus or methods.

In a further alternative, it is an object of the invention to at least provide a useful alternative to existing product distribution apparatus or methods.

Further objects will become apparent from the following description.

SUMMARY OF THE INVENTION

Accordingly in one aspect the invention provides a method for retail distribution of a plural of objects, the method including:

receiving information as to a sequence in which the plurality of objects will be placed on one or more retail shelves; and placing the objects on at least one carrying device in a such a way that objects may be removed from the carrying device in the order required for placement on the retail shelves.

Preferably the step of placement of objects on the carrying device occurs at a storage facility capable of supplying objects to a plurality of retail outlets at different physical locations, and the carrying device is transported to a retail outlet for placement of the objects on the retail shelves.

Preferably the step of receiving an order from, or on behalf of, a retail outlet for the plurality of objects at a storage or production facility, providing the plurality of objects and sorting the plurality of objects into a predetermined order for loading on or in the carrying device.

Preferably the method includes sorting the objects into a reverse order to the order in which they will be placed on the retail shelves.

Preferably the carrying device includes a first carrying shelf for carrying one or more of the objects arranged above a second carrying shelf for carrying one or more of the objects, and the method includes placing objects on the carrying shelves so that an object on the first shelf is intended to be placed on one of the retail shelves before an object on the second shelf.

Preferably the carrying shelves are vertically movable, the method including the step of unloading objects from the first carrying shelf, and raising the first carrying shelf or the second carrying shelf to facilitate unloading objects from the second carrying shelf.

Preferably the carrying shelves are vertically movable, the method including the step of loading objects onto the second carrying shelf, and lowering the second carrying shelf or the first carrying shelf to facilitate loading objects onto the first carrying shelf.

Preferably the carrying shelves are provided as a shelf assembly which is removably locatable in a container, and the method includes loading objects onto a carrying shelf and placing the loaded shelf in the container.

Preferably the carrying shelves are provided as a shelf assembly which is removably locatable in a container, and the method includes removing a carrying shelf from the container and unloading objects from the carrying shelf.

Preferably the carrying device includes a container and the method includes closing and/or sealing the container before delivery to a retail outlet.

Preferably the method includes modifying the atmosphere within the container.

In a further aspect the invention provides stacking apparatus including a plurality of tray members, each tray member having a support aperture adapted to accommodate an elongate support member, and support member engagement means to selectively engage with the elongate support member, whereby the position of each tray relative to the support member may be adjusted by disengaging the tray from the support member, moving the tray along the support member to a different position and re-engaging the tray with the support member.

Preferably the support member engagement means is configured such that rotational movement of the tray in a radial plane relative to the support member may selectively engage or disengage the tray to or from the support member.

Preferably the support member includes tray engagement means comprising a plurality of spaced projections or recesses, and the support member engagement means provided on a tray comprise a plurality of spaced recesses or projections.

Preferably rotation of the tray through an angle of 45 degrees is sufficient to engage or release the tray member with or from the support member.

The invention also broadly consists in any new feature or combination of features disclosed herein.

DRAWING DESCRIPTION

Figure 2:
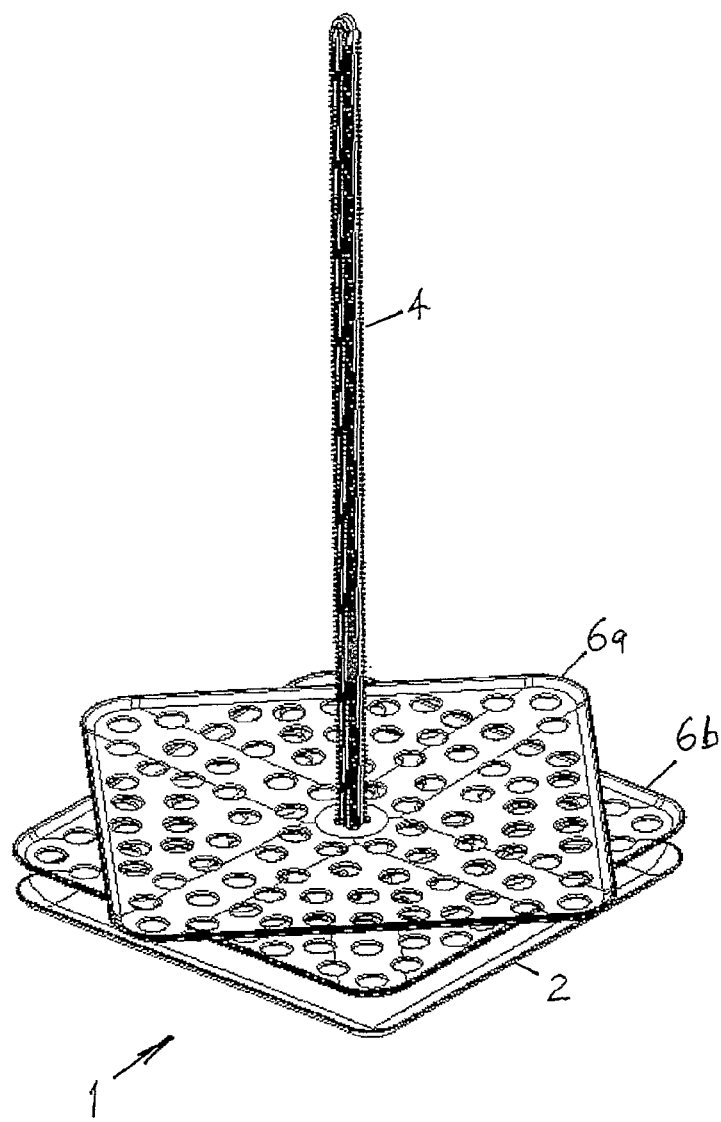
Figure 3:
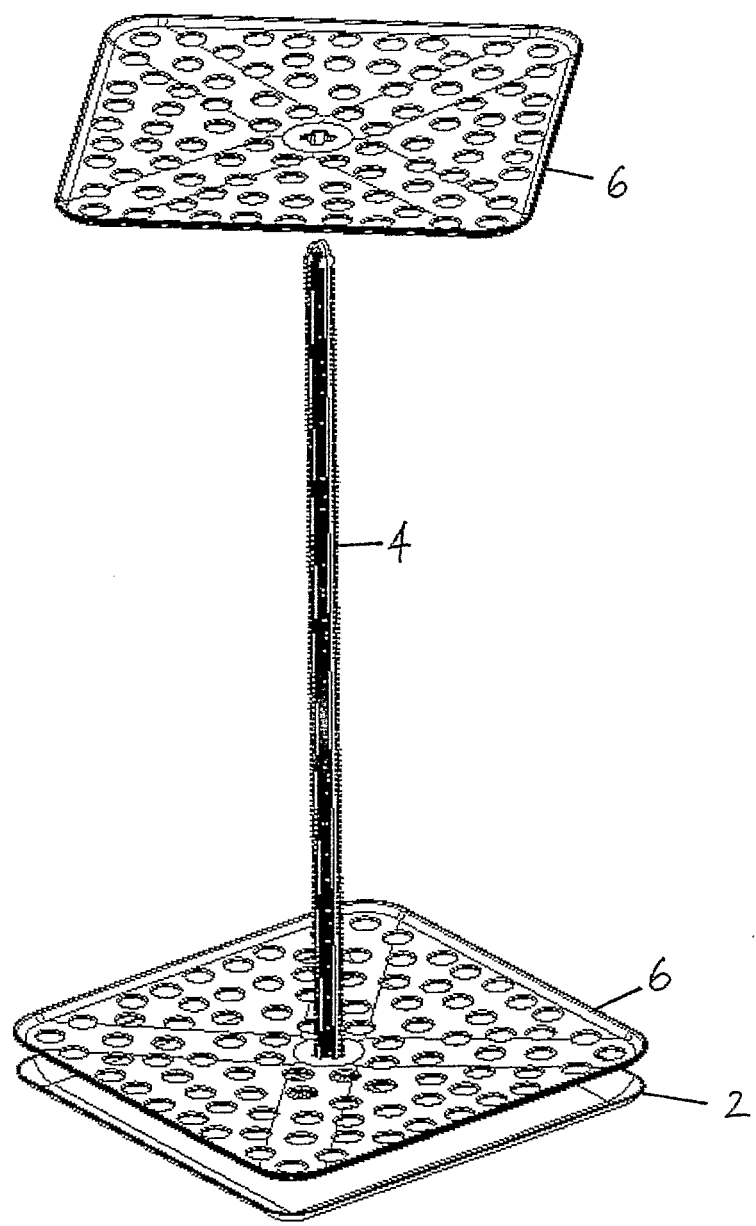
Figure 4:
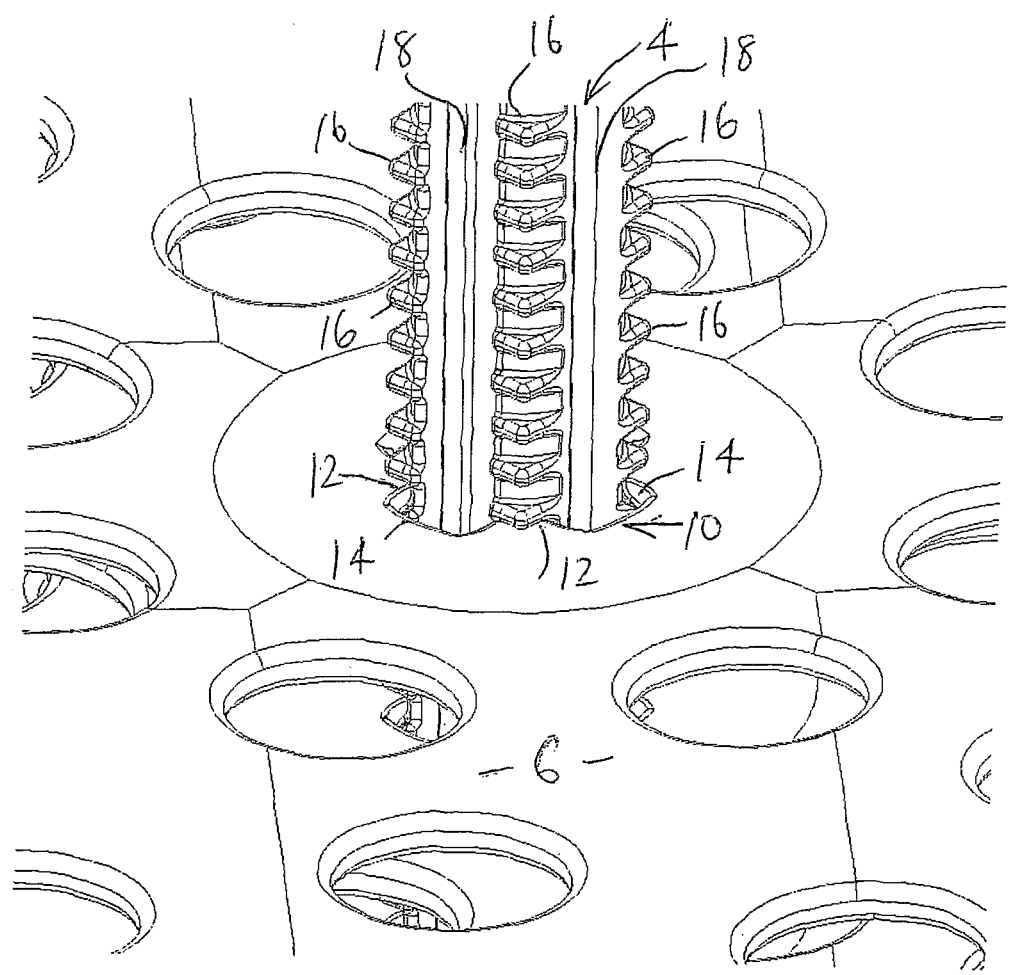
Figure 5:
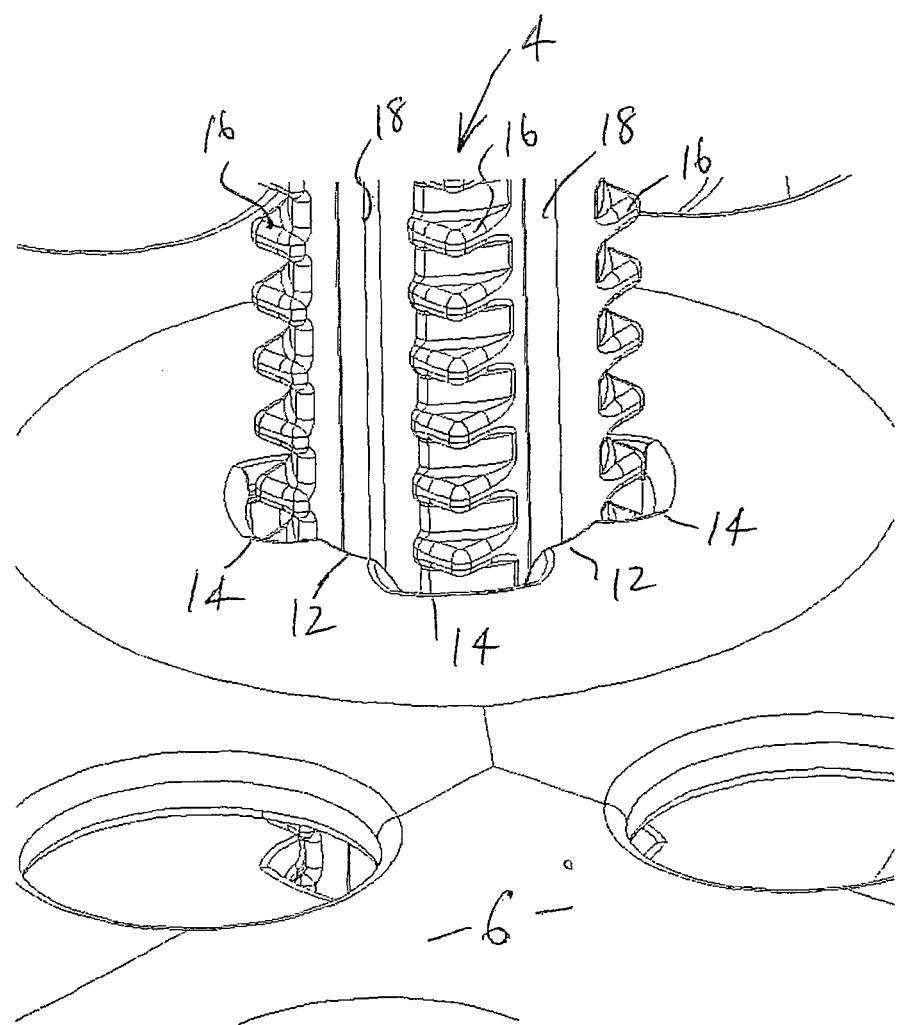
Figure 6:
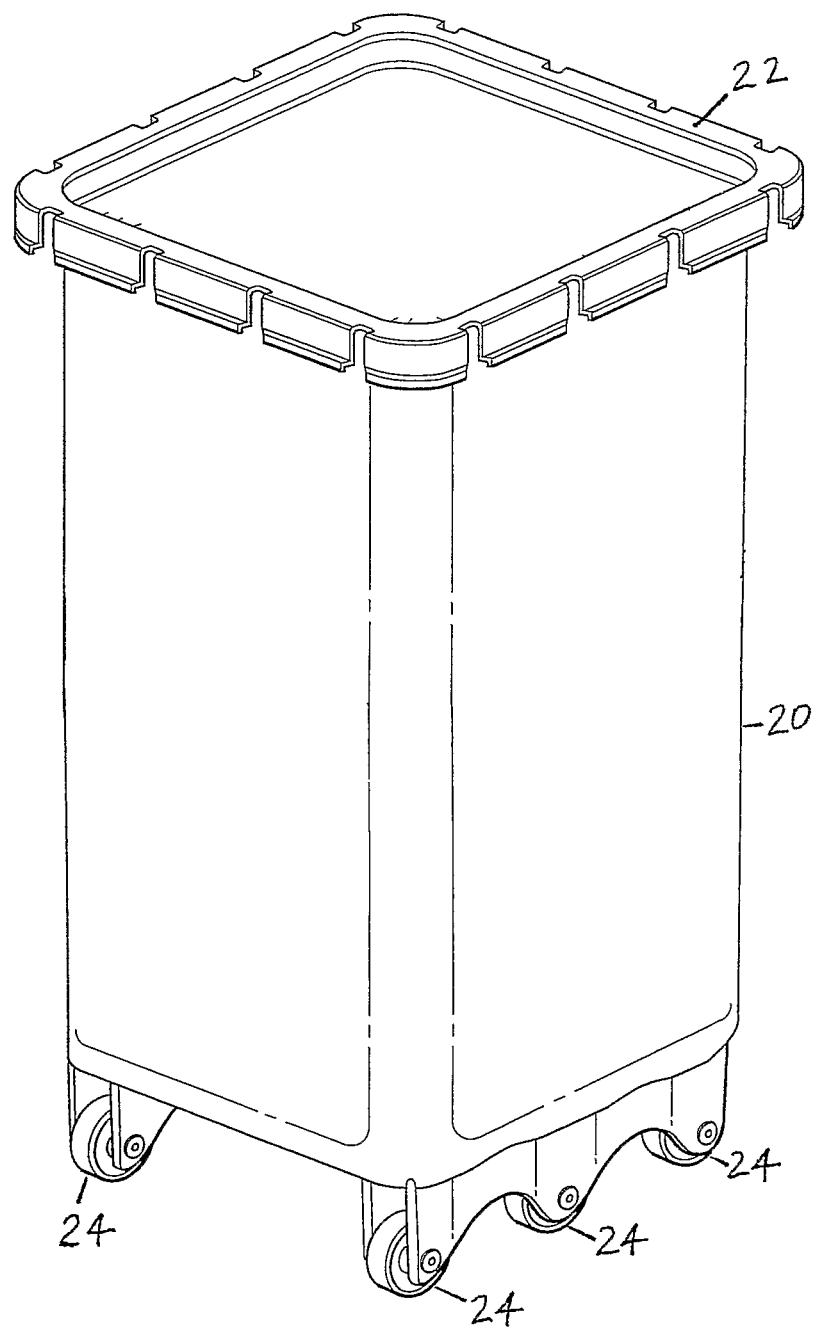
Figure 7:
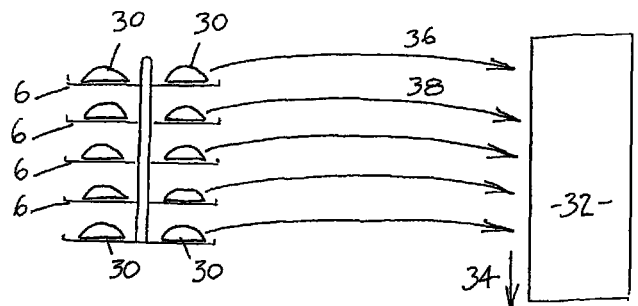
Figure 8:
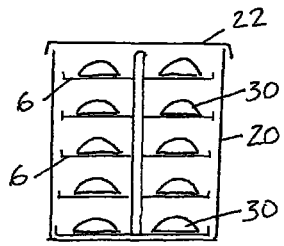
Figure 9:
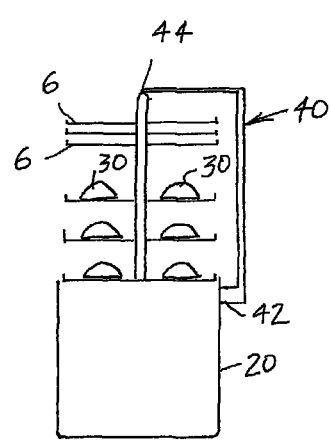
Figure 10:
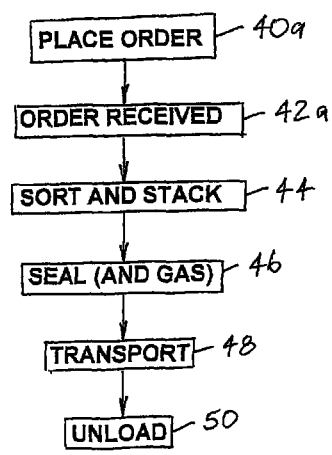

At least one preferred embodiment of the invention will be described below with reference to the accompanying drawings, in which;

FIG. 1: is an isometric view of a tray assembly;

FIG. 2: is an isometric view of the assembly of FIG. 1 showing two trays, the upper tray being provided in a disengaged position relative to the remainder of the apparatus;

FIG. 3: is an isometric view of the apparatus of the preceding figures showing only two trays, the upper tray having been removed from the apparatus;

FIG. 4: shows a partial isometric view of the apparatus of the preceding figures showing a tray member in an engaged position;

FIG. 5: shows the apparatus of FIG. 4 but with the tray member in a disengaged position;

FIG. 6: shows an isometric view of a container for use with the apparatus for the preceding figures;

FIG. 7: is a diagrammatic illustration of apparatus according to the preceding figures with the tray members carrying a number of objects and illustrating a process of stacking the objects on to a retail shelf;

FIG. 8: is a diagrammatic illustration of the apparatus of the preceding figures in use with a container;

FIG. 9: is a diagrammatic illustration of the apparatus as shown in FIG. 8, in a partially loaded or unloaded condition; and FIG. 10: is a flow diagram of a process according to the invention.

DETAILED DESCRIPTION

Referring to FIG. 1, a shelf or tray assembly according to the preferred embodiment of the invention is shown generally referenced 1. The assembly 1 in use provides a carrying device having shelving for carrying a number of objects, such as retail product items, to allow the objects to be transported to retail shelving in a retail outlet.

The assembly generally includes a base tray 2 from which an elongate substantially vertical and centrally orientated support member 4 depends. Engaged with support member 4 are a plurality of carrying shelves in the form of tray members 6 which may or may not include apertures 8. In the preferred embodiment tray members 6 are semi-rigid and the base tray is substantially rigid.

Turning to FIG. 2, the apparatus of FIG. 1 is illustrated, but with only two tray members 6a and 6b, the upper tray member 6a being disposed in an orientation where it is not engaged with the central support member 4. When a tray is in a disengaged orientation, such as is shown by the upper tray 6a FIG. 2, then that tray may be moved axially along the support member 4, and may be completely disengaged from the support member as shown in FIG. 3.

Those skilled in the art will appreciate that the manner in which the engagement or disengagement between each tray and the support member 4 may be effected in a variety of different ways. However, we have found that a mechanism whereby a tray is disposed in a different angular position in a radial plane relative to the support member (as shown in FIGS. 2 and 3), to allow engagement or disengagement, is practical and effective.

The manner in which this engagement is achieved is shown in greater detail in FIGS. 4 & 5. Referring to those figures, it can be seen that the aperture 10 in each tray which receives the support member 4 is shaped in such a way that it has protrusions 12 and/or recesses 14 which project into the centre of the aperture and retreat away from the centre of the aperture respectively.

It can also be seen from FIGS. 4 and 5 that the central support member 4 includes a plurality of projections or teeth 16. In the most preferred embodiment the teeth 16 are provided in four columns and they define 4 longitudinal recesses 18 that run between the columns of teeth 16.

Referring to FIG. 4, it can be seen that in the engaged orientation, the projections 12 about the aperture of the tray member engage in spaces between teeth 16 of the support column 4. Therefore, in this orientation, the column 4 supports the tray, since the tray cannot move axially along the column 4.

Turning to FIG. 5, the tray is shown in a disengaged disposition in which it can be seen that the projections 12 on the tray member project into the grooves 18 in between the rows of teeth 16. Also, the recesses 14 between projections 12 are spaced from teeth 16. Therefore, in this orientation, the tray is moveable axially relative to the support member 4.

Turning to FIG. 6, a container is shown which is adapted to receive the apparatus shown and described with reference to FIGS. 1 to 5. The container, which is generally referenced 20, has a removable lid 22 which may be sealably attached to the container to provide a substantially fluid tight seal so as to provide a desired environment within the container for products that may be disposed on tray members 6 within the container. This is advantageous for certain products including perishable foodstuffs such as meat products. The container preferably includes some form of conveying means such as rollers or wheels 24. The container may also include a tamper evident feature to allow unauthorised access to the container to be detected. This may take a variety of forms, for example one or more seals about the lid.

Alternatively, or in addition the lid may simply be designed to be difficult to remove by unauthorised persons or equipment.

In use, the shelves of the container may be arranged in a spaced apart relationship as is diagrammatically shown in FIG. 7. Therefore, the spacing between each of the trays 6 may be chosen or selected so that one or more objects 30 may be placed on each tray.

In a preferred embodiment of the invention, the objects are arranged on the trays to facilitate stacking of a shelf, particularly a shelf in a retail environment such as a store or supermarket, and the objects and/or trays are dimensioned so that the objects efficiently nest together leaving minimal unutilised space.

In FIG. 7, a retail shelf 32 is illustrated diagrammatically, and arrow 34 represents an intended path of movement of a person (or machine) stacking the shelf 32 in use. The shelf may be any one of a number of shelf types, for example it could comprise a refrigerated table or tray for displaying chilled or frozen foodstuffs such as meat products, or comprise part of a display cabinet, or even include a floor level display area. To facilitate stacking of the shelf 32, the objects 30 have been placed in a predetermined order on the trays 6. Therefore, the objects 30 which are on the top tray of the apparatus are first to be placed on the shelf 32 as indicated by arrow 36. Similarly, the objects on the next lowest tray are those that are next in the desired sequence for filling or stacking the shelf 32. The process continues in this fashion until the lowest tray in the stack is reached, and the objects of the lowest tray are those that are the last to be placed on shelf 32. Those skilled in the art will see that the apparatus may be used to stack a number of different shelves in complex sequences if desired. For example, multiple shelves provided one above the other may need to be stacked, and stacking may progress in a vertical direction or a combination of vertical and horizontal directions. The stacking process may also progress over a number of shelving installations or isles within the retail premises. A plurality of carrying shelf assemblies 1 may be provided, with the products in each being arranged so that after one assembly has been completely unloaded the required product sequence is continued in the next assembly until the stacking process is complete.

Referring to FIG. 8, a diagrammatic sectional view through a container including the support member 4 and tray 6 is illustrated, showing a typical arrangement of trays that include objects 30 (which in a preferred embodiment comprise meat packs).

In FIG. 9, a further diagrammatic cross section through the container and tray assembly is shown, however, in this illustration, a lifting mechanism in the form of a gantry 40 is illustrated. The gantry has a base 42 which engages with the container (for example a rim of the container), and has an arm 44 including a hook or similar engagement mechanism (not shown) that engages with a lifting eye 5 (refer FIG. 1) provided at the upper distal end of the support member 4. In the preferred embodiment the arm is telescopic in a vertical direction, being capable of a lengthening or contracting movement to raise or lower the tray assembly. This movement may be effected manually by a pump device or automatically using a motor driven hydraulic pump for example, or a pneumatic mechanism. Alternatively, the arm 44 may be of a fixed vertical height but instead carry a simple cable which has a hook to engage the lifting eye 5 with the cable being shortened or lengthened using a hand or motor operated winch provide on the gantry device 40 or provided on the container 20.

In FIG. 9, a method of placing objects 30 on each tray 6 is illustrated. As can be seen, the trays may be located at an upper end of the support member 4, then the lowermost tray may be disengaged from the support member, moved downwardly, then re-engaged at a position where it is just above the objects on the tray below. The objects are then placed on the tray that has just been moved downwardly, then the process can repeat. As described above, the objects are moved onto the tray in predetermined order so that the first objects loaded into the tray assembly are those that need to be the last that are stacked on a shelf. The gantry assembly may be lowered, so that the assembly is gradually lowered into the container as the tray stacking process progresses. Alternatively, the trays may be stacked substantially externally of the container, and then subsequently lowered into the container. As described above the gantry assembly 40 can include a manual or automatic lifting mechanism (for example a manual or electrically powered winch for example, or hydraulic or pneumatic apparatus), and this may be used to lift a loaded tray assembly 1 into or out of the container 20.

Tray unloading may also be performed in a similar manner. The products on the uppermost tray are unloaded onto the retail shelves following which the empty tray may be disengaged from the support member 4, moved to an upper end of the support member and re-engaged at the upper end so that it is clear of the remainder of the trays. The process continues with the gantry being used to gradually lift the assembly from the container 20 as required to allow access to the uppermost tray. At the end of this process the empty trays are located at the upper end of the support member 4, ready to be returned to a storage facility to loaded with further product.

The ability to move the trays 6 relative to the support member 4 allows the objects that the trays carry to be easily accessed for loading and unloading operations. Those skilled in the art to which the invention relates will appreciate that the loading and unloading processes could be carried out using a tray assembly in which the tray positions were not adjustable.

Once the trays have been stacked with objects and lowered into the container, the container lid 22 may be put in place, and the container can be gassed to modify the atmosphere within the container if desired. This may be desirable for preserving the quality of some products such as meat. The container can then be transported on its own wheels 24 for example, or using other apparatus such as a pallet, forklift or truck, to transport the apparatus to a desired destination, such as a retail store.

Once the apparatus has been disposed in the retail store environment, which is the intended destination for the objects packed within the container, then the lid 22 is removed, and the gantry apparatus is used to begin lifting the tray assembly from the container. Again, the gantry can be used to progressively lift the assembly for shelf stacking the objects, or the entire assembly can be substantially removed from the container before stacking begins. As the objects are removed from each tray, then the tray is moved upwardly, the upper distal end of the support arm 4 (as illustrated in FIG. 9), so that the packing process is substantially reversed.

Turning to FIG. 10, a general method or process flow is illustrated. The process begins at step 40 by an order for a number of products being received from a retail outlet. This order may alternatively be made by a central coordinating entity on behalf of the retail outlet. In one example a supermarket may place an order for meat products.

In step 42, the order is received by a manufacturing or storage facility. The facility is provided with information about the retail shelf layout of the retail outlet. This may be a layout that is common to all stores, so the information is effectively required only once. Alternatively, different stores may have different layouts that require different shelf stacking flows, and this information may be provided with each new order. The necessary information may be provided in a database, for example, that can be accessed by the facility as required for future orders.

The facility then obtains the products from a storage section. Products such as meat cuts which have been processed and wrapped are provided into the storage section. When the retail order arrives, the products may be selected and moved to a sorter.

The sorter sorts the products in reverse order (step 44), or an order so that when they are stacked or packed into the tray assembly as described earlier in this document, they can be unpacked in the required order for stacking retail shelves. Alternatively, the products may be selectively removed from their locations in storage in such a way that the products are delivered in the desired order for packing on the tray assembly and subsequent retail shelf stacking according to the store layout.

When the trays are lowered into the container (or prior to this point), the container is labelled so that the contents are known. The stacking of tray assembly 1 and containerisation of the packed tray assembly 1 may be performed by machine.

In step 46 the container is sealed and gassed (dependent on the products it contains) to provide a desired atmosphere.

It is then transported to the retail outlet in step 48, and unloading takes place in step 50. Unloading may occur by machine, for example by having the gantry 40 automatically lift the tray assembly from the container, and use an appropriate mechanism (which may be solenoid actuated for example) to move the trays as they are unloaded. Alternatively, unloading is performed manually.

Wherein the foregoing description reference has been made to specific components or integers of the invention having known equivalents, then such equivalents are herein incorporated as if individually set forth.

Although this invention has been described by way of example and with reference to possible embodiments thereof, it is to be understood that modifications or improvements may be made thereto without departing from the scope of the invention as defined in the appended claims.

The invention claimed is:

1. Retail product distribution apparatus for distribution of retail product items onto retail shelving, the apparatus comprising:
   an assembly of an elongate support member and a plurality of tray members, each tray member having a support aperture adapted to accommodate the elongate support member, and an edge of the support aperture having a formation for selective engagement with the elongate support member, whereby the position of each tray member relative to the elongate support member can be adjusted by disengaging the tray member from the elongate support member, moving the tray member along the elongate support member to a different position and re-engaging the tray member with the elongate support member;
   a container in which the assembly is removably disposed, said container having a base and a mouth and one or more substantially vertical sidewalls extending between the base and the mouth; and
   a lid configured to attach to the container and seal the mouth of the container;
   wherein said one or more vertical sidewalls have a portion with a substantially flat inner surface, each said tray member has an outer edge configured to be contained by said substantially flat inner surface when said tray member is engaged with the elongate support member and locked in position, and said tray member is thereby prohibited from rotatably disengaging with the elongate support member.

2. Apparatus as claimed in claim 1 wherein the formation is configured such that rotational movement of the tray member in a radial plane relative to the elongate support member can selectively engage or disengage the tray member to or from the elongate support member.

3. Apparatus as claimed in claim 1 or claim 2 wherein the elongate support member includes a plurality of spaced projections or recesses, and the formation comprises a plurality of spaced recesses or projections.

4. Apparatus as claimed in claim 2 wherein rotation of the tray member through an angle of 45 degrees relative to the elongate support member is sufficient to engage or release the tray member with or from the elongate support member.

5. Apparatus as claimed in claim 1, wherein the lid is sealably attached to the container.

6. Apparatus as claimed in claim 5, wherein when the lid seals the container a gas is contained therein to modify the atmosphere of the container.

7. Retail product distribution apparatus for distribution of retail product items onto retail shelving, the apparatus including:
   a container having a mouth, a base wall and one or more substantially vertical side walls extending between the base and the mouth to define a containment region;
   a vertically movable carrying device adapted to be received in the containment region, the carrying device having a plurality of carrying shelves located one above the other, each carrying shelf being adapted to carry one or more of the items; and
   a lid configured to attach to the container and seal the mouth of the container,
   wherein said one or more vertical sidewalls have a portion with a substantially flat inner surface, each of said plurality of carrying shelves has an outer edge configured to be contained by said substantially flat inner surface when each of said plurality of carrying shelves is engaged with the carry device and locked in position, and each of said plurality of carrying shelves is thereby prohibited from rotatably disengaging with the carry device.

8. Apparatus as claimed in claim 1, further comprising a lifting mechanism engageable to an upper portion of the assembly for vertically lifting the assembly from and lowering the assembly into the container, wherein the lifting mechanism is configured to allow said trays members to be selectively positioned above the container to facilitate removal of items from one of said tray members for placement onto the retail shelving.

9. Apparatus as claimed in claim 7, further comprising a lifting mechanism engageable with an upper portion of the vertically moveable carrying device for lifting the carrying device out of the containment region,
   wherein the lifting mechanism is configured to be capable of selectively positioning the carrying shelves above the containment region to facilitate removal of items from one of said carrying shelves for placement onto the retail shelving, and
   wherein the position of one of said carrying shelves can be adjusted relative to the position of another one of said carrying shelves.

10. Apparatus as claimed in claim 1, further comprising a lifting mechanism engageable to an upper portion of the assembly for vertically lifting the assembly from and lowering the assembly into the container, wherein the lifting mechanism is engageable with an upper distal end of the elongate support member.

11. Apparatus as claimed in claim 7, wherein the lid is sealably attached to the container.

12. Apparatus as claimed in claim 11, wherein when the lid seals the container a gas is contained therein to modify the atmosphere of the container.

* * * * *